(12) United States Patent
Brown et al.

(10) Patent No.: US 7,238,026 B2
(45) Date of Patent: Jul. 3, 2007

(54) ACTIVITY DEVICE

(75) Inventors: Jeffrey A. Brown, Hamburg, NY (US); Bradley M. Clark, Orchard Park, NY (US); Gary E. Weber, Buffalo, NY (US)

(73) Assignee: Mattel, Inc., El Segundo, CA (US)

( * ) Notice: Subject to any disclaimer, the term of this patent is extended or adjusted under 35 U.S.C. 154(b) by 293 days.

(21) Appl. No.: 10/980,824

(22) Filed: Nov. 4, 2004

(65) Prior Publication Data

US 2006/0093995 A1    May 4, 2006

(51) Int. Cl.
*G09B 19/00* (2006.01)
(52) U.S. Cl. .................................................. 434/258
(58) Field of Classification Search ................ 434/258, 434/259, 260, 319; 446/175, 397, 408; 84/470 R, 84/476, 600, 609
See application file for complete search history.

(56) References Cited

U.S. PATENT DOCUMENTS

| | | | |
|---|---|---|---|
| 2,416,959 A | 3/1947 | Segal | |
| 2,994,967 A * | 8/1961 | Klamer et al. | 434/259 |
| 3,430,962 A | 3/1969 | Davenport | |
| 3,506,267 A | 4/1970 | Taillie | |
| 3,760,511 A * | 9/1973 | Matsumoto | 434/259 |
| 4,149,717 A | 4/1979 | Seijiro | |
| 4,243,227 A | 1/1981 | Strongin | |
| 4,286,952 A * | 9/1981 | Roche | 434/259 |
| D262,549 S | 1/1982 | Clanton | |
| 4,353,701 A * | 10/1982 | Greenberg | 434/259 |
| 4,508,512 A * | 4/1985 | Girsch et al. | 434/259 |
| 4,521,024 A | 6/1985 | Slade | |
| 4,552,362 A | 11/1985 | Oake | |
| 4,609,356 A * | 9/1986 | Gilden et al. | 434/259 |
| 4,610,637 A | 9/1986 | Ferguson | |
| 4,651,613 A * | 3/1987 | Harrison | 84/95.2 |
| D296,451 S | 6/1988 | Ming | |
| 4,968,255 A | 11/1990 | Lee et al. | |
| 5,139,453 A | 8/1992 | Aiken et al. | |
| 5,195,919 A | 3/1993 | Hasegawa | |

(Continued)

FOREIGN PATENT DOCUMENTS

GB    2 275 207 A    8/1994

OTHER PUBLICATIONS

Fisher-Price Peek-a-Blocks™ Tumblin' Sounds Giraffe™, http://www.fisher-price.com/us/infanttoys/product.asp?s=bupeek&id=21658&index=0&pos=0, Sep. 2, 2003.

(Continued)

*Primary Examiner*—Kurt Fernstrom
(74) *Attorney, Agent, or Firm*—Edell, Shapiro & Finnan LLC

(57) ABSTRACT

A multiple-sided activity device for toy blocks is disclosed. The activity device has a first side including a first activity adapted to interact with at least one of the plurality of toy blocks. The activity device also has a second side distinct from the first side, the second side including a block recognition mechanism configured to selectively interact with any of the plurality of toy blocks to identify which of the plurality of toy blocks is interacting with the block recognition mechanism and to produce block-specific sensory stimulating output.

35 Claims, 14 Drawing Sheets

U.S. PATENT DOCUMENTS

| | | | |
|---|---|---|---|
| 5,314,338 A | | 5/1994 | Caveza et al. |
| 5,349,129 A | * | 9/1994 | Wisniewski et al. .......... 84/600 |
| 5,451,178 A | * | 9/1995 | Yorozu et al. .............. 446/175 |
| 5,454,745 A | | 10/1995 | Spielberger |
| 5,674,103 A | | 10/1997 | Bean |
| 6,132,281 A | * | 10/2000 | Klitsner et al. ................ 446/75 |
| 6,231,345 B1 | * | 5/2001 | Yamazaki et al. .......... 434/259 |
| 6,271,453 B1 | * | 8/2001 | Hacker ......................... 84/476 |
| 6,353,168 B1 | * | 3/2002 | Sosoka et al. ................ 84/600 |
| 6,513,708 B2 | | 2/2003 | Evans |
| 6,525,252 B1 | | 2/2003 | Klausen et al. |
| 6,755,655 B2 | | 6/2004 | Marcus et al. |
| 6,991,509 B1 | * | 1/2006 | Carley et al. .............. 446/175 |
| 7,006,786 B2 | * | 2/2006 | Marcus et al. .............. 434/362 |
| 2002/0061701 A1 | | 5/2002 | Chan |
| 2003/0153238 A1 | | 8/2003 | Chan |

OTHER PUBLICATIONS

Fisher-Price Baby Smartronics™ Cookie Shape Surprise™, http://www.fisher-price.com/us/products/product.asp?id=3145, Sep. 2, 2003.

Fisher-Price Little People Discovery City, Model No. 74715, © 2000 Mattel.

Edushape Ltd., Discovery Cube, http://www.amazon.com/exec/obidos/tg/detail/-/B0000645DH/qid=1062508507/sr+1-9/ref=ref=sr_I_9/002-5156659-0286416?v=gla, Sep. 2, 2003.

Melissa & Doug Shape Sorting Cube, http://www.amazon.com/exec/obidos/tg/stores/detail/-/toys/B00005RF5G/qid%3Dl098979110/sr%3Dll-l/ref%3Dsr%5F11%5F1/002-3123073-0554466, Sep. 2, 2003.

Neurosmith Phonics Tiles, http://www.amazon.com/exec/obidos/tg/detail/-/B00006694G/ref=cm_bg_d/002-5156659-0, Sep. 2, 2003.

Neurosmith 2.0 Music Blocks, http://www.amazon.com/exec/obidos/tg/detail/_/B000068OH5/ref=cm_bg_d/002-5156659-0286416?v=glance, Sep. 2, 2003.

Parents Activity Puzzle Cube, http://www.target.com/gp/detail.html/602-6934779-8650260?asin=B00005O0H4, Sep. 10, 2003.

Hasbro, Form Fitter, Item #00322, http://hasbro.com/pl/page.viewproduct/product_id.8598/dn/default.cfm, Sep. 2, 2003.

Small World Kids Busy Box, #9517715, http://www.smallworldtoys.com/Webvision?qid=search&loc=qcksearch&Login=consumer&Password=c99st8321&lsLogin=X&5=0&e=10&searchtxt=%25BUSY%20BOX%25, Sep. 12, 2003.

* cited by examiner

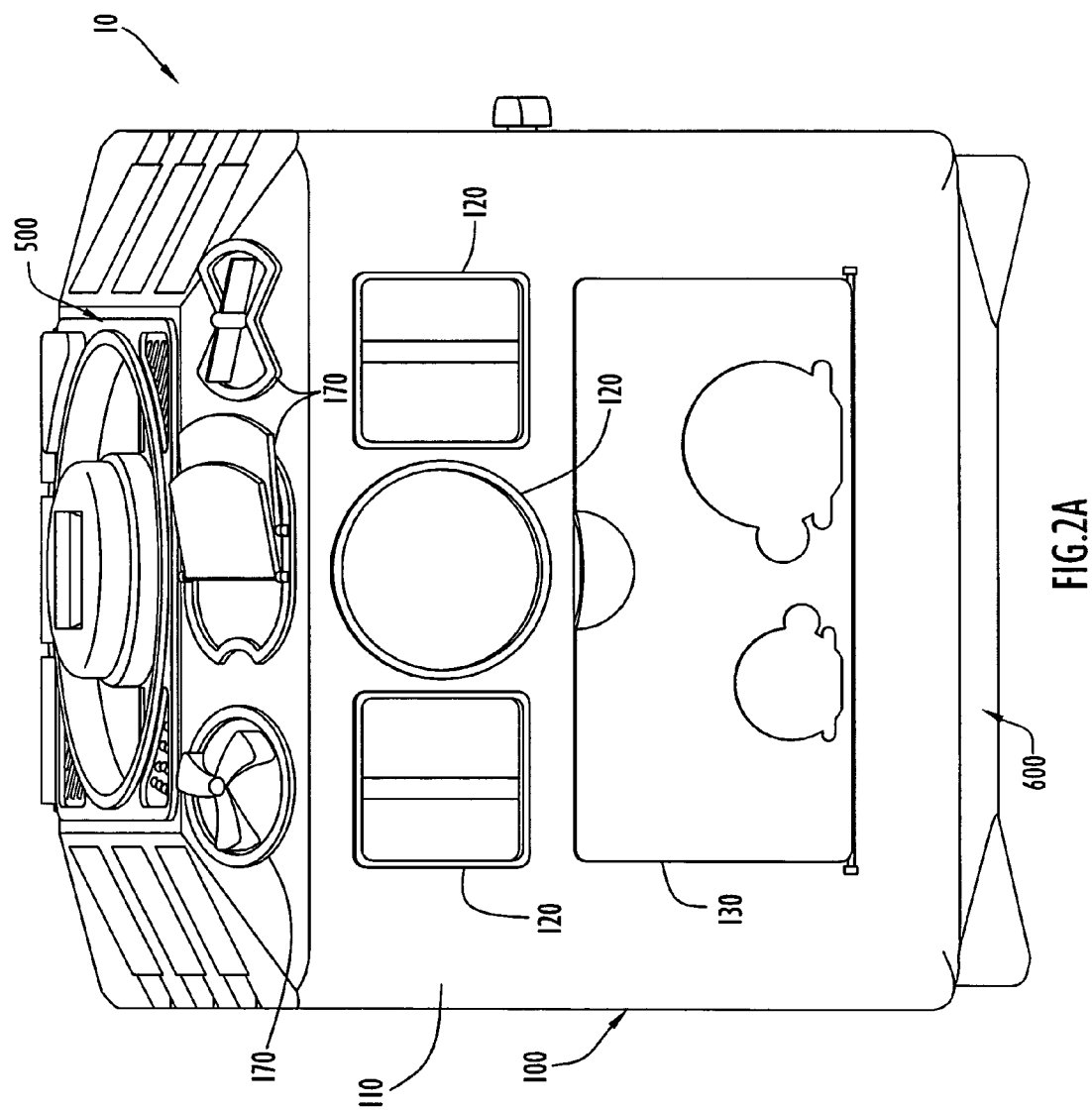

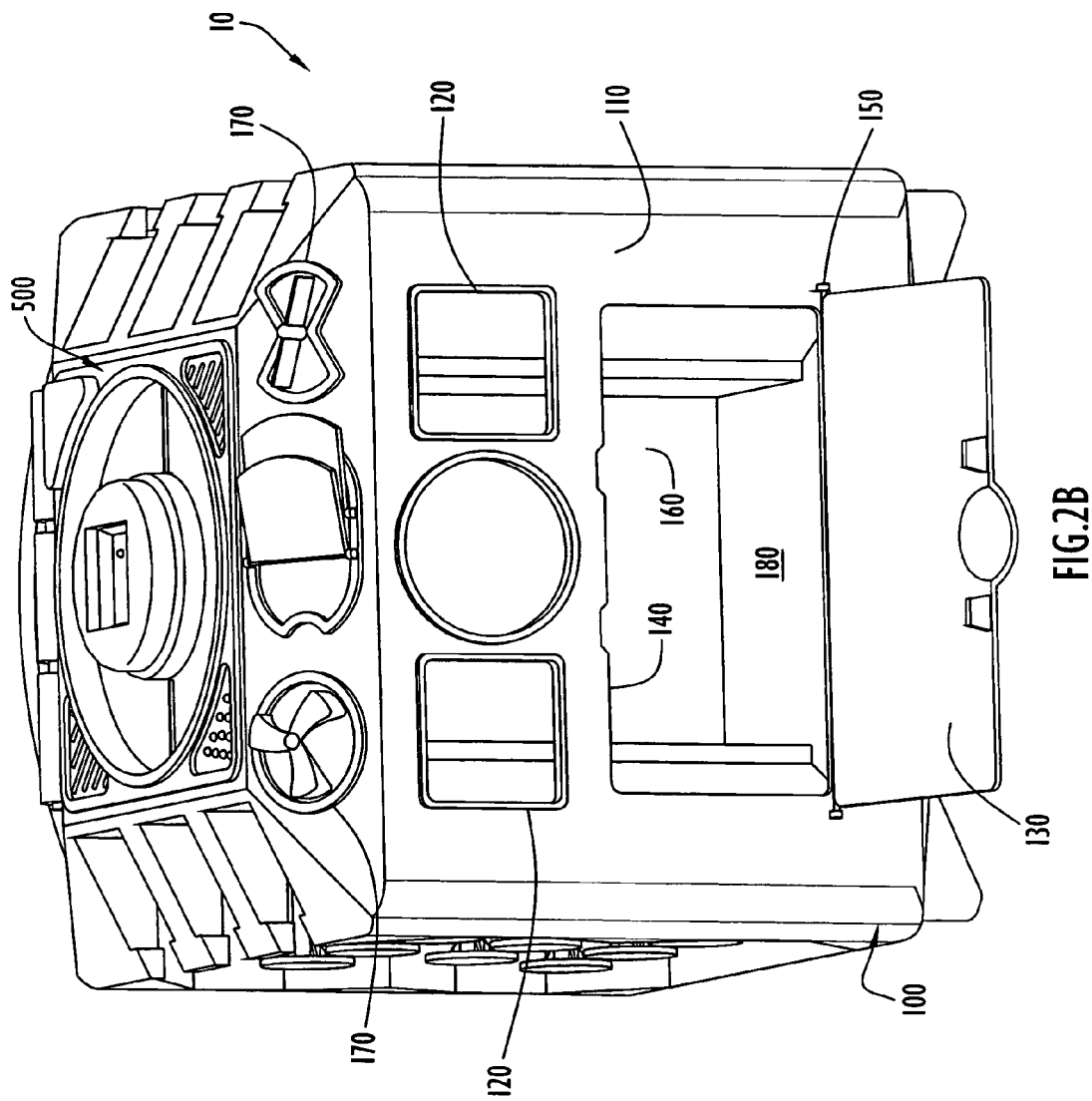

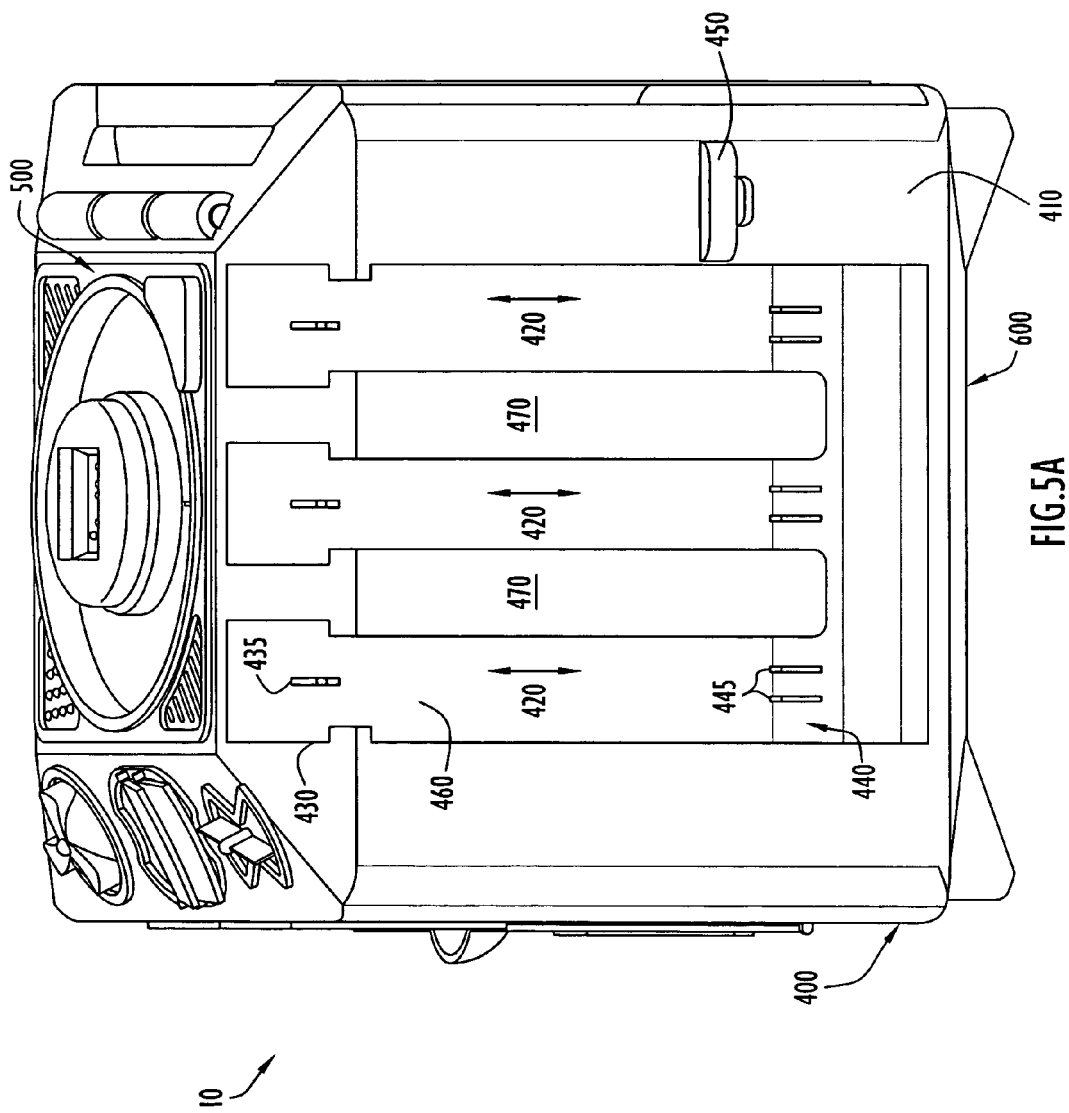

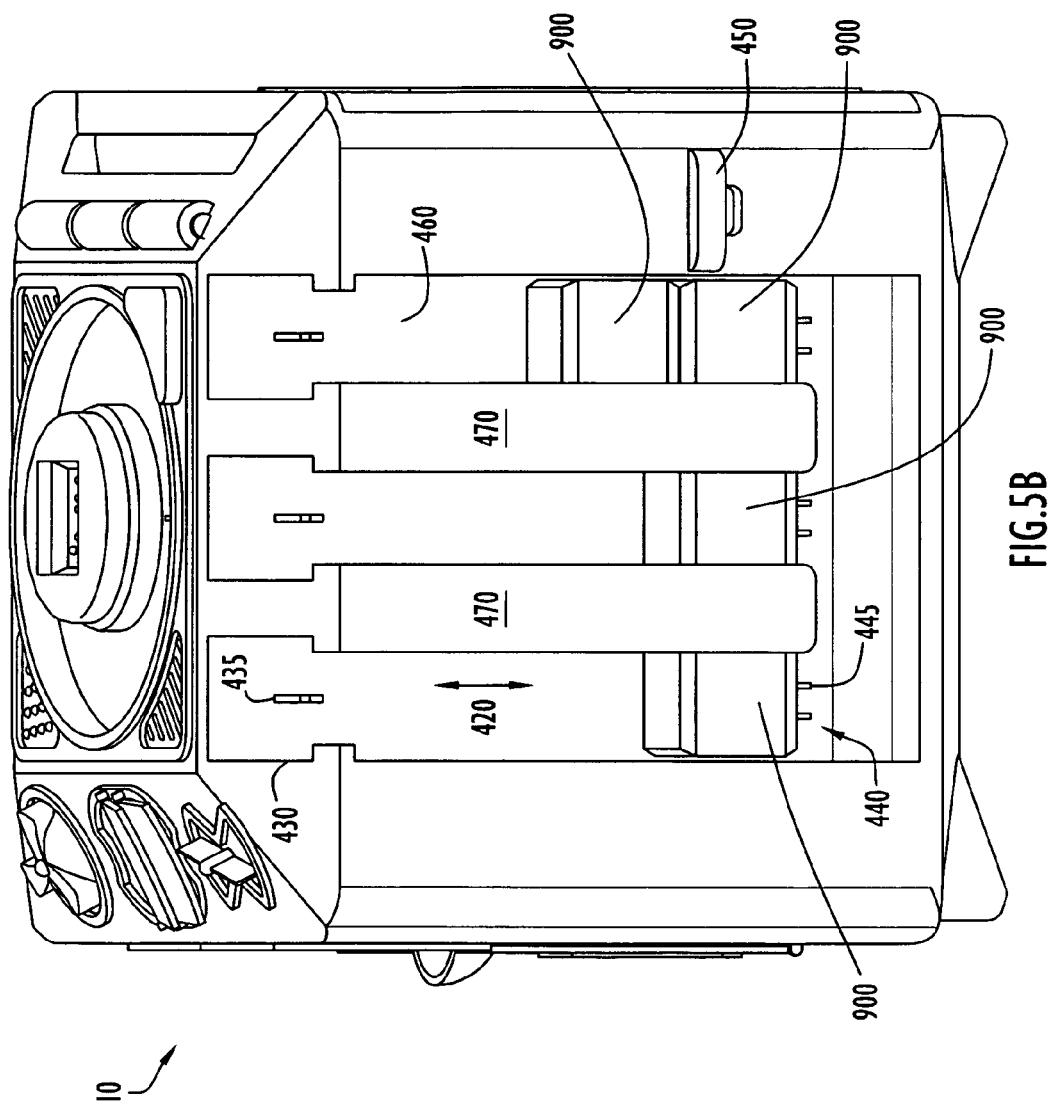

ACTIVITY DEVICE

FIELD OF THE INVENTION

The present invention relates to an activity device and, more particularly, to an activity device or toy for use with a plurality of toy blocks including an interactive block activity and a block recognition mechanism.

BACKGROUND

Children enjoy playing with blocks, assembling the blocks into and disassembling the blocks from various configurations. Blocks, moreover, assist in a child's development. Activities including blocks help children understand spatial concepts and foster problem-solving skills as they figure out how to stack and build with the blocks. Block activities, moreover, encourage the development of balance and motor skills. By grasping and stacking blocks, children enhance their fine motor skills, including hand-eye coordination. Children, moreover, are more apt to learn in a fun, positive environment. Consequently, it is desirable to provide an activity device for use with toy blocks that assists a child in not only developing motor skills, but also in developing cognitive abilities through name recognition and positive reinforcement.

This invention is directed generally to an activity device for use with a plurality of toy blocks and, in particular to an activity device including a first side comprising a first entertainment activity adapted to interact with at least one of the plurality of toy blocks and a second side including a block recognition mechanism comprising a device configured to identify any of the plurality of toy blocks when placed thereon.

SUMMARY

Generally, the embodiments of the present invention provide an activity device or toy and, more particularly, a multiple-sided activity device for toy blocks including a block recognition mechanism configured to interact with said plurality of blocks to produce block-specific sensory stimulating output.

BRIEF DESCRIPTION OF THE DRAWINGS

FIGS. 2A and 2B illustrate perspective views of one side of the activity device of FIG. 1, showing a sorter activity.

FIGS. 5A–5C illustrate a perspective views of still another side of the activity device of FIG. 1, showing one block drop activity.

Like reference numerals have been used to identify like elements throughout this disclosure.

DETAILED DESCRIPTION

In accordance with the present invention, an activity device for use with a plurality of toy blocks is disclosed. An embodiment of the activity device of the present invention comprises a housing including at least a first side and a second side, where the first and second sides are distinct. The first side comprises an activity adapted to interact with at least one of the plurality of toy blocks. In this embodiment, the second side comprises a block recognition mechanism capable of selectively interacting with any of the plurality of blocks to identify the block and activate sensory stimulating output.

Figure 1:
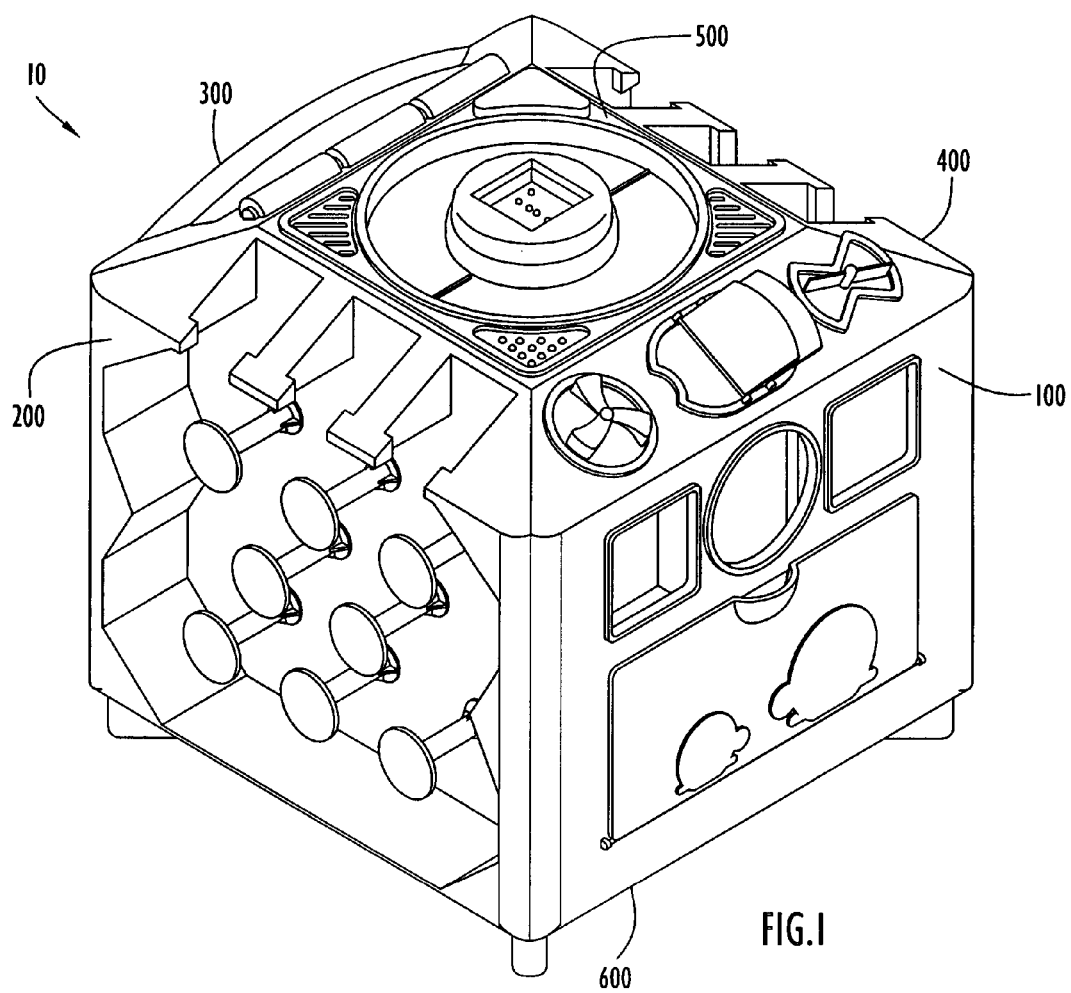
FIG. 1 illustrates a perspective view of an activity device according to an embodiment of the present invention.

FIG. 1 illustrates a perspective view of an activity device 10 according to an embodiment of the invention. The activity device 10 comprises at least a plurality of toy blocks (not shown in FIG. 1, but described in greater detail below) and a housing including at least one interactive block activity and a block recognition mechanism. As shown, the activity device 10 comprises a housing configured to house a control unit and one or more interactive block activities. As shown in the embodiment of FIG. 1, the housing of the activity device 10 includes a generally cubic structure having six distinct sides. Specifically, the activity device 10 includes a housing having first side 100, a second side 200, a third side 300, a fourth side 400, a fifth or top side 500, and a sixth or bottom side 600. The activity device 10 of the present invention is not limited to the structure illustrated in FIG. 1, and may comprise any shape, size, or number of sides.

At least one side of the activity device 10 includes an activity configured to interact with the toy blocks. The type of activity is not limited, so long as it is configured to interact with the toy blocks (i.e., where at least one of the toy block is part of the play pattern associated with the activity on the at least one side of the activity device 10). Specific examples of activities configured to interact with the toy blocks are illustrated in FIGS. 2–6. Specifically, FIGS. 2A and 2B illustrate a perspective view of the first side 100 of the activity device 10, showing a shape/block sorting activity according to an embodiment of the present invention. As shown, the first side 100 may include an exterior wall 110 extending from the bottom side 600 of the activity device 10 to the top side 500 of the activity device 10. The exterior wall 110 of the first side 100 includes one or more apertures 120 configured to receive a toy block or other small toys. The shape of the block-receiving apertures 120 may include, but is not limited to, geometric shapes such as squares, circles, etc.

As shown in FIGS. 2A and 2B, the first side 100 of the activity device 10 may further include a door 130 configured to open and close, exposing an opening 140 in the exterior wall 110. Specifically, the first side 100 includes a door 130 pivotally connected to the exterior wall 110 via a pivot post 150. In the embodiment of FIGS. 2A and 2B, the pivot post 150 connects the door 130 to the exterior wall 110 along the bottom edge of the door 130. With this configuration, the door 130 may be pivoted outward from a vertical, closed position (shown in FIG. 2A) to a horizontal, opened position (as shown in FIG. 2B), and vice versa. As best seen in FIG. 2B, the first side 100 of the activity device 10 may further include an interior wall 160 spaced in parallel relation to the exterior wall 110, defining a cavity 180 adapted to store at least one toy block. In use, with the door 130 in its closed position, a child may place a toy block through one of the block-receiving apertures 120 and permit it to fall to the floor of the cavity 180. When desired, the door 130 can be pivoted downward to its opened position, exposing the opening 140 and providing access to the cavity 180 so that a child may retrieve the toy blocks inserted through one of the block-receiving apertures 120. In addition, the first side 100 of the activity device 10 may further include one or more interactive entertainment features 170 including, but not limited to, a spinning disk or flipping doors.

Figure 3:
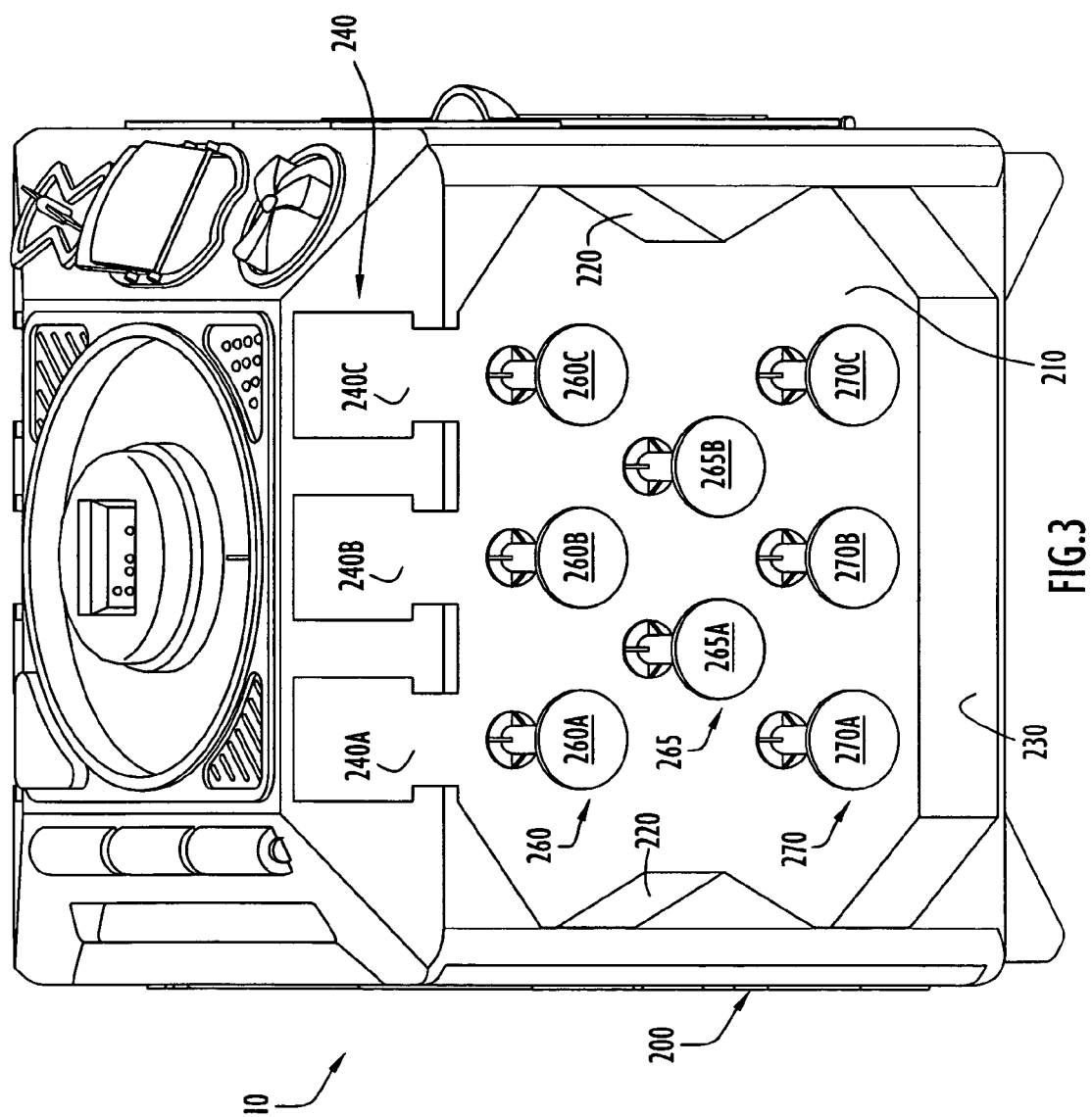
FIG. 3 illustrates a perspective view of one other side of the activity device of FIG. 1, showing a pachinko game activity.

The second side 200 of the activity device 10 may include an interactive block activity stylized as a pachinko game. FIG. 3 illustrates a perspective view of the second side 200 of the activity device 10. As shown, the second side 200 of the activity device 10 includes an inset wall 210 surrounded by edges extending outward to form a border. Specifically, the border defines two side portions 220 extending outward from the vertical edges of the inset wall 210; a lower, floor portion 230 extending outward from the base of the inset wall 210 and between the two side portions 220; and an upper, block insert portion 240 extending outward from the top of the inset wall 210 and also between the two side portions 220. The side portions 220 may be configured to redirect a toy block in a desired direction. Specifically, the side portions 220 may include an undulating topography (e.g., inclining and declining sections) configured to direct a toy block away from or towards the side portions 220. The block insert portion 240 includes one or more openings 240A, 240B, and 240C configured to receive a toy block.

A series of posts 260A, 260B, 260C, 265A, 265B, 270A, 270B, 270C may extend radially outward from the surface of the inset wall 210. Each of the posts 260A–C, 265A–B, and 270A–C may be generally cylindrical and include a substantially circular cap disposed at its terminal end and extending radially from each post. The posts 260A–C, 265A–B, and 270A–C are configured to provide interstices through which a toy block may travel. As shown in the embodiment of FIG. 3, the second side 200 of the activity device 10 includes an upper row of posts 260, a middle row of posts 265, and a lower row of posts 270. The three posts 260A, 260B, and 260C of the upper row 260 are substantially aligned with the three openings 240A, 240B, and 240C of the block insert portion 240. The upper row of posts 260 is spaced below the openings 240A–C to provide sufficient clearance for a toy block to travel through the openings 240A–C and around the posts 260A–C (i.e., along either the left or the right of each post 260A–C).

Similarly, the lower row of posts 270 includes three posts 270A, 270B, 270C, with each aligned vertically with respect to a corresponding post 260A–C in the upper row 260. The posts 270A–C of the lower row 270 are spaced to permit a block to pass along either side of each post. The middle row of posts 265 is positioned between the upper row 260 of posts and the lower row 270 of posts, and is spaced to permit the passage of a block between the rows. The middle row of posts 265 includes two posts 265A, 265B. The middle posts 265A–B are offset with respect to the posts of the upper row 260 and the lower row 270. As shown in FIG. 3, one middle post 265A is disposed between upper row posts 260A and 260B; similarly, the other middle row post 265B is disposed between upper row posts 260B and 260C.

In use, a toy block is inserted into an opening 240A–C of the block insert portion 240. The toy block travels downward, engaging one or more of the rows of posts 260, 265, 270 and the surfaces of the side portions 220 until it reaches the floor portion 230.

Figure 4:
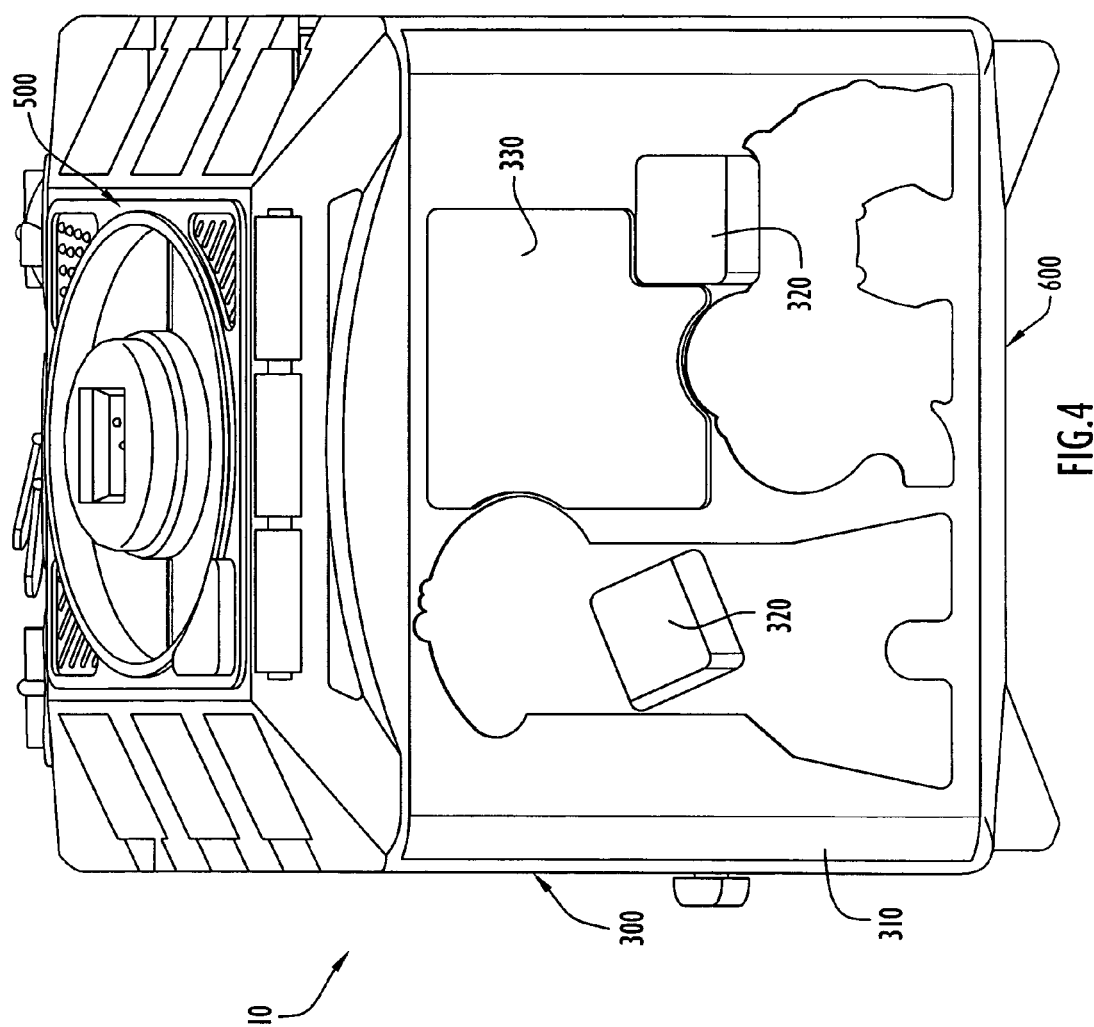
FIG. 4 illustrates a perspective view of yet another side of the activity device of FIG. 1, showing a block receptacle activity.

The third side 300 of the activity device 10 may include an interactive block activity comprising at least one receptacle operable to receive a toy block. FIG. 4 illustrates a perspective view of the third side 300 of the activity device 10 including a block activity according to an embodiment of the present invention. As shown, the third side 300 of the activity device 10 includes an exterior wall 310 extending from the bottom side 600 of the activity device 10 to the top side 500 of the activity device 10. The exterior wall 310 includes at least one closed-end receptacle 320 transversely disposed therein and configured to removably receive at least a portion of a toy block. In use, a child may place a toy block (not shown) into one of the closed-end receptacles 320 by axially inserting the toy block into the receptacle 320. The third side 300 may further include one or more interactive entertainment features, including but not limited to a mirror feature 330 that permits a child to view her reflection.

Figure 5C:
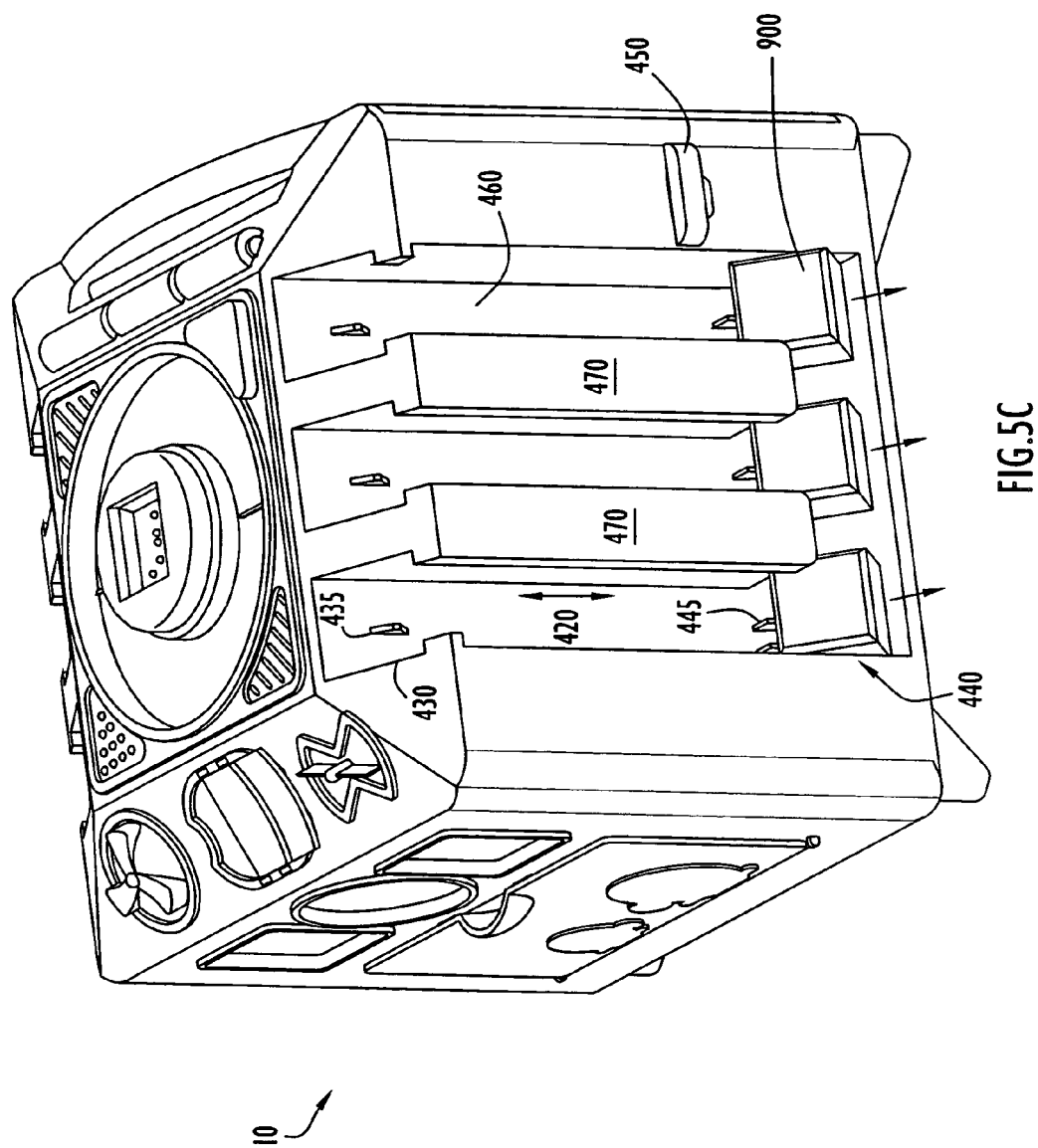

The fourth side 400 of the activity device 10 may include an interactive block activity comprising at least one chute configured to slidably receive a toy block. FIGS. 5A–C illustrate perspective views of the fourth side 400 of the activity device 10, showing a "stack and spill" block activity according to an embodiment of the present invention. As shown, the fourth side 400 of the activity device 10 includes an exterior wall 410 extending from the bottom side 600 of the activity device 10 to the top side 500 of the activity device 10. The exterior wall 410 includes one or more inset vertical chutes 420 adapted to slidably receive a toy block. As shown in the embodiment of FIGS. 5A–C, each inset chute 420 includes a block entrance 430 and a block exit 440, both of which are configured to permit the passage of a toy block therethrough. The back wall 460 of each chute 420 may curve outward at its base (near the block exit 440—as best shown in FIG. 5C) to direct a toy block outward (away from the activity device 10) as it slides down the chute 420. As illustrated, more than one chute 420 is present and thus, a vertical divider 470 may be disposed between a pair of adjacent chutes in order to keep the chutes 420 separated.

Each chute 420 may further include at least one actuator or switch 435 disposed along the chute's travel path. In the embodiment of FIGS. 5A–C, the switch 435 is located proximate the block entrance 430. The type of switch 435 is not limited, and may include mechanical, electrical, magnetic, and optical switches. By way of example, as shown in FIGS. 5A–C, the switch 435 includes a depressible element protruding from the back wall 460 of the chute 420. Each switch 435 may be operatively coupled to a control unit (not shown—discussed in greater detail below) such that, when the switch 435 is actuated, a signal is sent to the control unit, which, in turn, generates electronic sensory stimulating output such as audio and visual output (discussed below). In operation, a toy block 900 (shown in FIGS. 5B–C) is inserted into the block entrance 430 of one of the chutes 420. The toy block 900 travels down the chute 420, actuating (depressing) the switch 435, which, in turn, activates the control unit. The control unit may then produce electronic sensory stimulating output as a result of the actuation.

Each chute 420 may further include a retractable catch member 445 configured to impede the travel of a toy block through the chute 420. Referring to FIG. 5A, the catch member 445 may be disposed along the travel path of the chute 420, proximate the block exit 440. The catch member 445 may protrude from the back wall 460 of the chute 420 through a slot (not labeled). Referring to FIG. 5B, the catch member 445 is configured to contact the toy block 900 as it travels down the chute 420, preventing the block 900 from exiting the chute 420. Preferably, the catch member 445 is positioned near the base of the chute 420, close to the block exit 440, enabling the chute 420 to store a plurality of toy blocks 900. Each catch member 445 may be controlled by a catch release mechanism. Specifically, an actuator or lever 450 may retract the catch member 445 into the interior of the housing of the activity device 10, clearing the travel pathway of the chute 420 and permitting the toy block 900 to fall to the bottom of the chute 420 and out the block exit 440 (as best seen in FIG. 5C) onto the supporting surface.

Figure 6A:
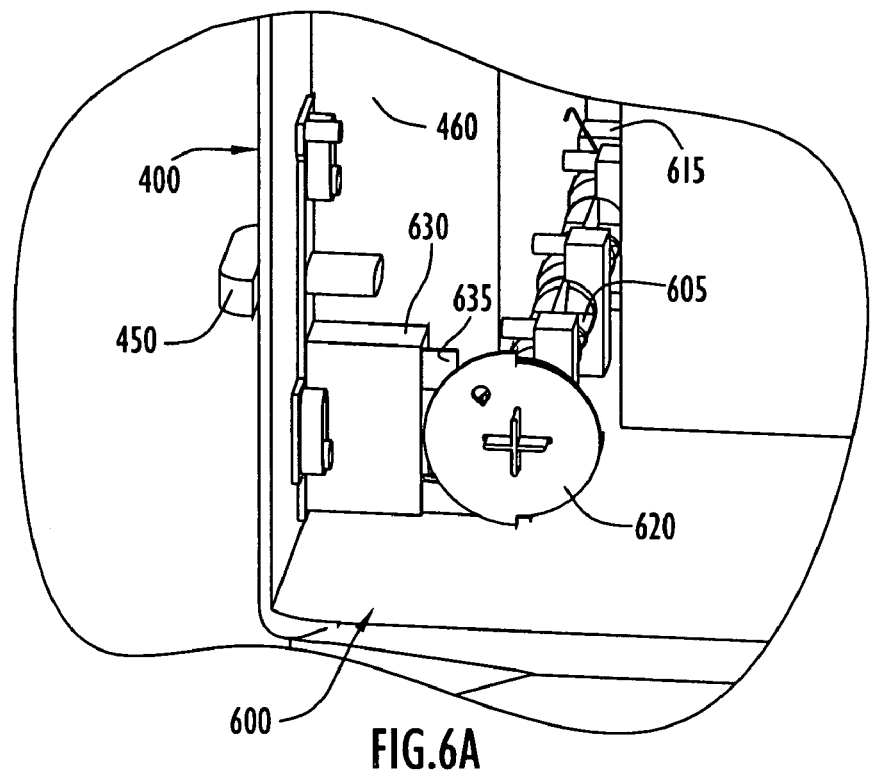
FIGS. 6A–B illustrate an internal perspective view of the activity device of FIG. 1, showing the block release mechanism of the block drop activity.
Figure 6B:
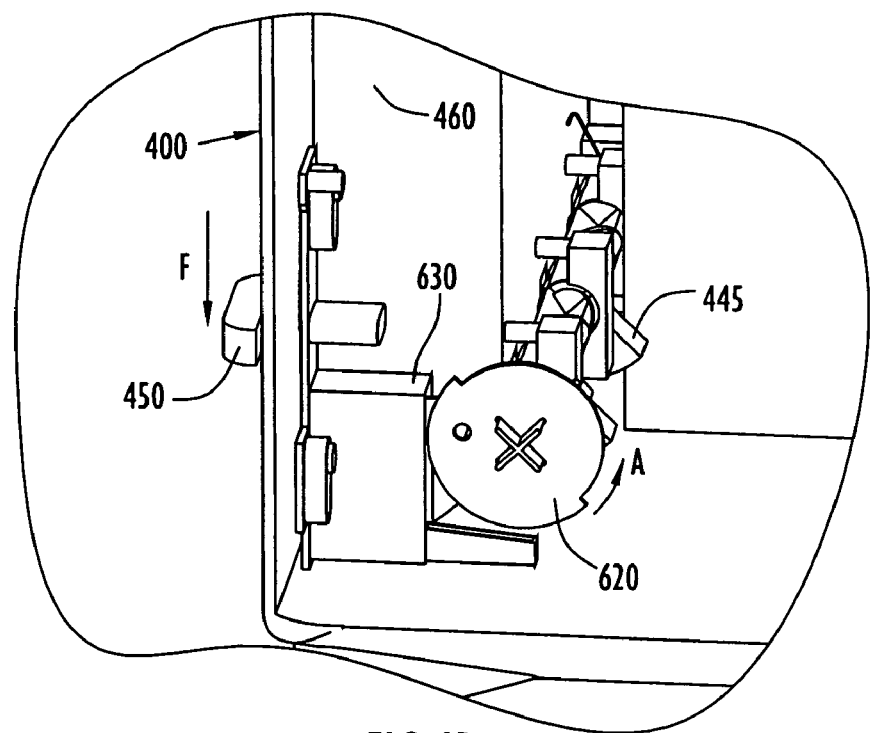

FIGS. 6A and 6B illustrate interior views of the activity device 10, showing the operation of the catch mechanism 600 according to embodiment of the invention. As shown in FIG. 6A, the catch mechanism 600 includes a shaft 605 rotatably mounted to a bracket 615 at one end, and to a spool or reel 620 at the opposite end. The catch member 445 (seen best in FIG. 6B) extends transversely or radially outward from the surface of the shaft 605 and through a slot (not labeled) formed in the back wall 460 of the chute 420. The actuator 450 controls a boss 630 configured to slide along the interior surface of the fourth side 400 of the activity device 10. The boss 630 is spring biased in an upward position, which, in turn, biases the shaft 605 such that in its normal position, the catch member 445 is extended through the slot formed in the back wall 460 of the chute 420 (i.e., blocking the chute 420). A pair of arms 635 (an upper arm and a lower arm) extend from the boss 630 to the spool 620. The spool 620 is adapted to capture the pair of arms 635 along its core (i.e., between the "walls" of the spool) such that, when the boss 630 slides longitudinally (vertically), one arm of the arm pair 635 engages an interior edge portion of spool 620, rotating the spool 620.

In operation, as shown in FIG. 6B, when a force in the direction of arrow F is applied to the lever 450, the boss 630 moves downwards. This causes the arm pair 635 to move downward, with the upper arm of the arm pair 635 engaging the interior edge of the spool 620. The force applied by the upper arm of the arm pair 635 rotates the spool 620 in the direction of arrow A (counterclockwise). This, in turn, rotates the shaft 605 in a counterclockwise direction, causing the catch member 445 to retract from the slots formed in the back wall 460 of the chute 420 and into the interior of the housing of the activity device 10 (i.e., un-blocking the chute 420). Conversely, when the lever 450 is released, a biasing element (e.g., a spring—not shown) moves the arm pair 635 upward, with the lower arm of the arm pair 635 engaging the interior edge of the spool 620, forcing the spool 620 to rotate in a clockwise direction. This rotation of the spool 620 in the clockwise direction causes the catch member 445 to extend back through the slots formed in the back wall 460 of the chute 420 and into the interior of the chute 420 (i.e., blocking the chute 420).

Figure 7:
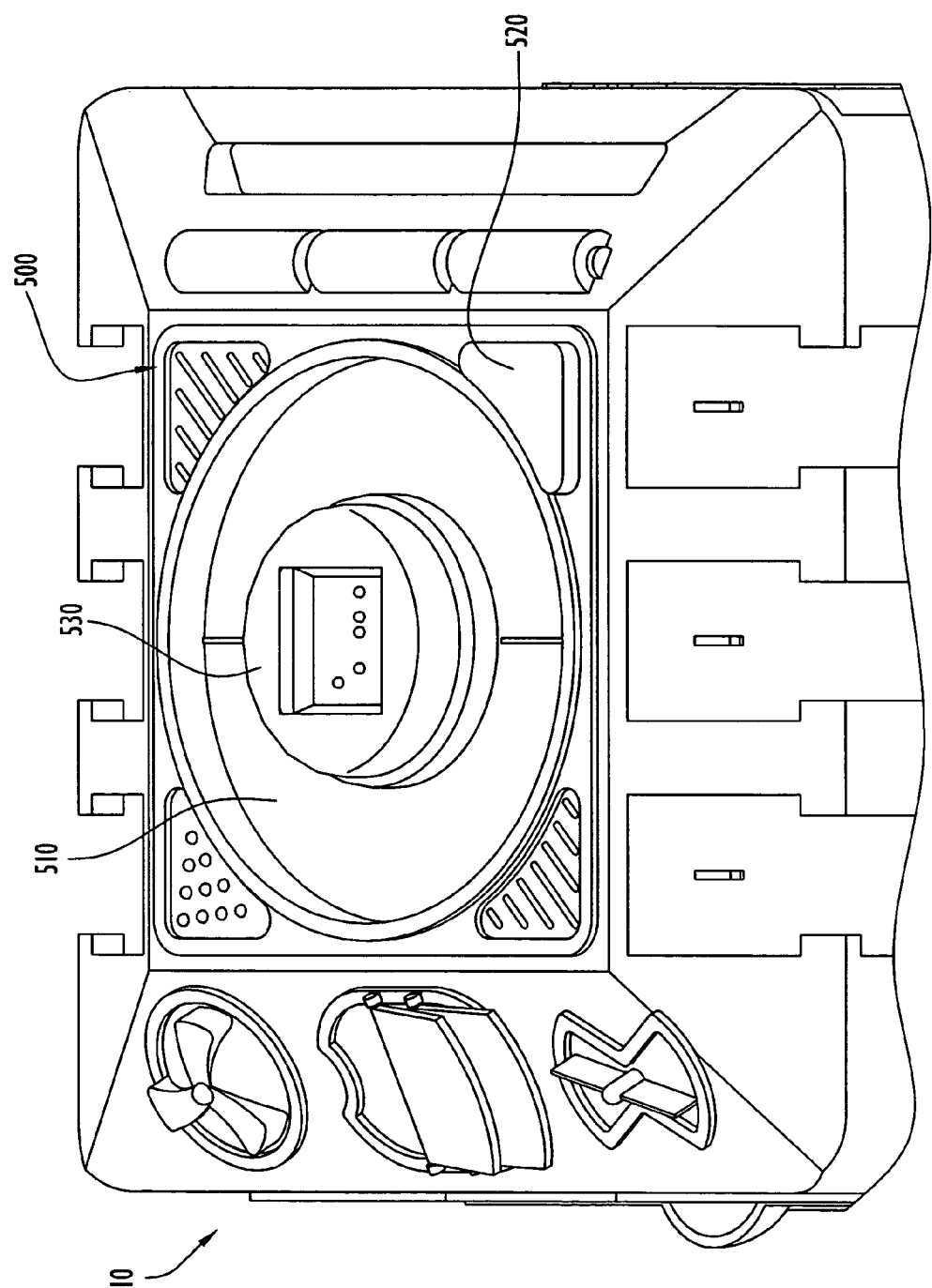
FIG. 7 illustrates a perspective view of the top side of the activity device of FIG. 1, showing a block recognition mechanism.

FIG. 7 illustrates the top side 500 of the activity device 10 according to an embodiment of the present invention. In the embodiment shown, the top side 500 of the activity device 10 includes an animated or moveable member 510, an actuator or button 520, and a block recognition mechanism 530. The animated member 510 may include a structure adapted for movement. The structure of the animated member 510 may include, but is not limited to, structures adapted to rotate, oscillate, spin, depress, slide, etc. The animated member 510, moreover, may be motorized, manually operated, or both. In the embodiment illustrated in FIG. 7, the animated member 510 comprises a platform having a generally annular shape. The animated member 510 is not limited to that shown in FIG. 7 and may comprise any shape or size. A motor (not shown) may drive the animated member 510, causing it to rotate about its central axis.

The actuator 520 may be used to activate the animated member 510. Specifically, the motor may be operably coupled to a control unit (discussed in greater detail below), which, in turn, may be operably coupled to the actuator 520. Consequently, when the actuator is engaged, it generates a signal. The control unit may be configured to recognize the signal and generate an actuator specific sensory stimulating output, namely, activating the motor to drive the animated member 510. The top side 500 of the activity device 10 may further include other interactive features such as manual entertainment features or other electronic entertainment features operably coupled to the control unit.

Figure 8:
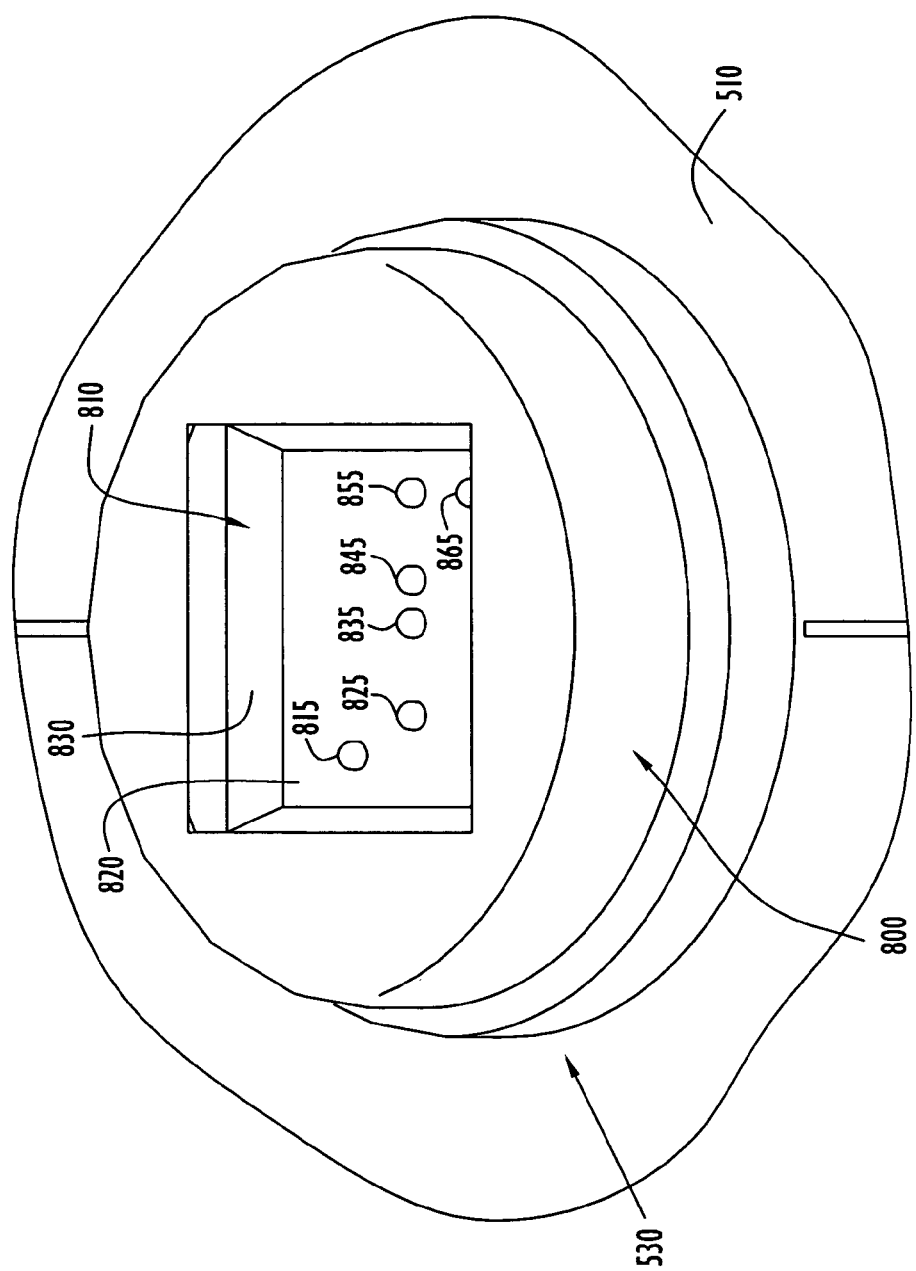
FIG. 8 is an isolated perspective view of the block recognition mechanism of FIG. 7.

FIG. 8 illustrates an isolated perspective view of the block recognition mechanism 530 of FIG. 7. The block recognition mechanism 530 includes a structure adapted to receive a toy block 900 as well as to house a sensor capable of identifying the toy block 900. The block recognition mechanism 530 may include a housing 800 with a well or socket 810 defined therein. The housing 800 may comprise a generally hollow structure configured to contain a sensing device and optionally, sensory output generating devices such as lights. The housing 800 may comprise any material such as plastic, and may be colored, transparent, translucent, opaque, or a combination thereof. When lights are placed within housing, the material comprising the housing 800 is preferably generally transparent or translucent. The housing 800, moreover, may comprise any shape or size. As shown in the embodiment of FIG. 8, the housing 800 may comprise a generally circular shape configured to fit within the interior space of the generally annular animated member 510 (as shown in the embodiment of FIG. 7).

As indicated above, the housing 800 of the block recognition mechanism 530 may include a socket 810. The socket 810 may include a structure configured to receive a toy block 900. By way of example, and as illustrated in FIG. 8, when the toy blocks are cubic in shape, the socket 810 may include a generally square base 820 with four upwardly extending side walls 830. The side walls 830 extend upward from each side of the base 820. The side walls 830, moreover, may extend at an outward and upward angle with respect to the base 820. This configuration helps direct the block 900 into the socket 810 of the block recognition mechanism 530, as well as maintain the block 900 in the proximity of the sensing device once the block is inserted into the socket 810 of the recognition mechanism 530 (explained in greater detail below).

The sensing device of the block recognition mechanism 530 may be configured to selectively interact with at least one of the toy blocks. Specifically, the sensing device may be configured to sense encoding provided on each of the toy blocks when at least one of the toy blocks is appropriately positioned with respect to the sensing device of the block recognition mechanism 530. Consequently, the sensing device of the block recognition mechanism 530 includes at least one sensor capable of being selectively activated by the toy blocks. The type of sensor includes, but is not limited to, mechanical sensors, magnetic sensors, electrical sensors, and optical sensors. As shown in the embodiment of FIG. 8, the sensing device of the block recognition mechanism 530 includes a switch matrix comprising a plurality of sensors. Specifically, the sensing device of the block recognition mechanism 530 includes a plurality of mechanical switches 815, 825, 835, 845, 855, and 865 mounted to the base 820 of the block recognition mechanism 530. The switches 815, 825, 835, 845, 855, and 865 are depressible, and are operably coupled to the control unit (not shown). Each of the switches 815, 825, 835, 845, 855, and 865 may be configured to send a unique signal to the control unit. The control unit, moreover, may be configured to recognize each individual switch signal, as well as a pattern (or combination) of switch signals (when more than one switch is depressed). The control unit may be operably coupled to sensory output generating devices such as speakers and lights, and be configured to activate the devices to generate electronic sensory stimulating output based upon the combinations of switches actuated by insertion of a toy block into the socket 810 of the block recognition mechanism 530.

In accordance with the present invention, the toy block 900 may comprise any size and shape, so long as it is adapted to interact with both the block recognition mechanism 530 and one or more of the interactive block activities of the activity device 10. By way of example, the toy block 900 may comprise any geometric shape including, but not limited to, spheres and polygons. By way of further example, the toy block 900 may comprise a cube including six generally planar sides. The toy block 900 may be part of a set of toy blocks, wherein the set includes a plurality of blocks capable of being stacked, one upon another. Preferably, the toy block is part of a set of toy blocks, wherein at least two of the toy blocks are of substantially similar geometric shape. A preferred, commercially available block is the Peek-a-Blocks™ series of stacking toy blocks available from Fisher-Price, Inc. of East Aurora, N.Y. It is understood, however, that the size, shape, or type of block is not limited to those disclosed herein.

Figure 9:
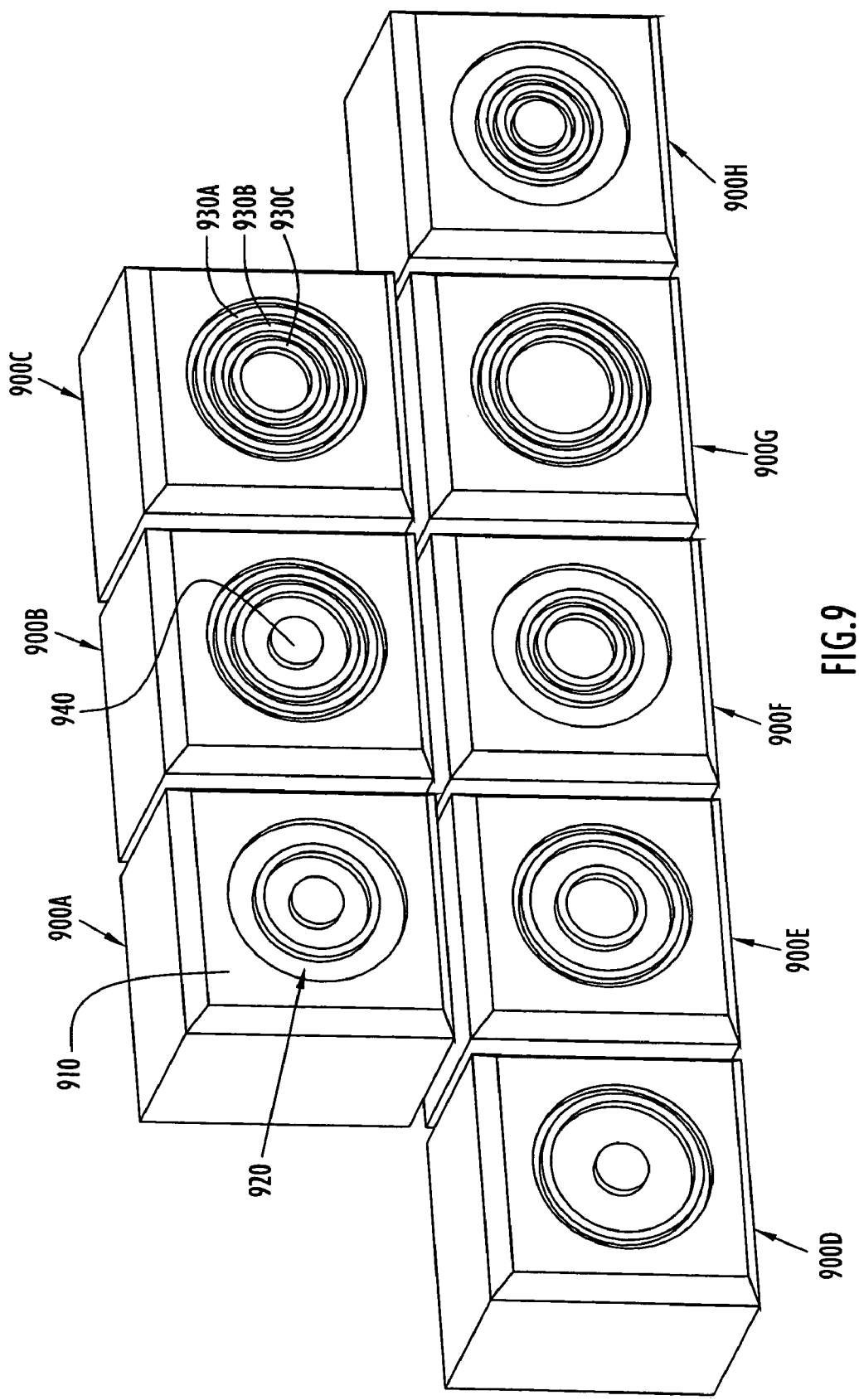
FIG. 9 illustrates an end view of the toy blocks according to one embodiment of the present invention showing exemplary switch encoding patterns.

As discussed above, the toy block 900 is encoded to selectively engage the sensing device of the block recognition mechanism 530. FIG. 9 illustrates an end view of a plurality of toy block blocks 900 according to an embodiment of the present invention, showing the blocks in a stacked formation. As shown in the embodiment of FIG. 9, the set of toy blocks may include eight blocks 900A, 900B, 900C, 900D, 900E, 900F, 900G, and 900H, each having a substantially similar shape. The toy blocks 900A, 900B, 900C, 900D, 900E, 900F, 900G, and 900H preferably include at least two generally planar surfaces. In the embodiment shown, each of the blocks 900A–H includes six generally planar surfaces. At least one of the generally planar surfaces includes an encoding or pattern 920 configured to selectively actuate the sensing device of the block recognition mechanism 530. The encoding 920 may include, but is not limited to, physical, magnetic, and optical encoding capable of being sensed/read by an appropriate sensing device. In the embodiment illustrated in FIG. 9, the base 910 of each toy block 900A–H includes a physical pattern 920 configured to selectively actuate the switches 815, 825, 835, 845, 855, and 865 of the switch matrix located on the base 820 of the block recognition mechanism 530. The physical pattern 920 may include any design that selectively actuates the switch matrix (described above).

As shown in the embodiment of FIG. 9, the physical pattern 920 includes one or more annular projections (concentric rings) extending radially from the central axis of the block base 910. For example, toy block 900C includes a series of protruding concentric rings 930A, 930B, 930C separated by a series of generally annular recesses. With this configuration, a series of "ridges" and "valleys" is formed, wherein the ridges are capable of selectively engaging the switches of switch matrix (i.e., the projection pattern 920 is sized and positioned to actuate one or more of the switches 815, 825, 835, 845, 855, and 865 located on the base 820 of block recognition mechanism 530). As shown with specific reference to blocks 900A, 900B, 900D and 900H the pattern 920 may further include a substantially cylindrical post 940 positioned proximate the center of the concentric rings (i.e., extending axially from the surface of block base 910). As shown in the embodiment of FIG. 9, each toy block 900A, 900B, 900C, 900D, 900E, 900F, 900G, and 900H may be provided with a unique pattern 920, wherein each unique pattern 920 selectively engages the switches 815, 825, 835, 845, 855, and 865 of the switch matrix located on the base 820 of the block recognition mechanism 530. As a result, each block 900A–H is mechanically encoded with its own unique identity by its unique pattern 920 of concentric rings.

Figure 10:
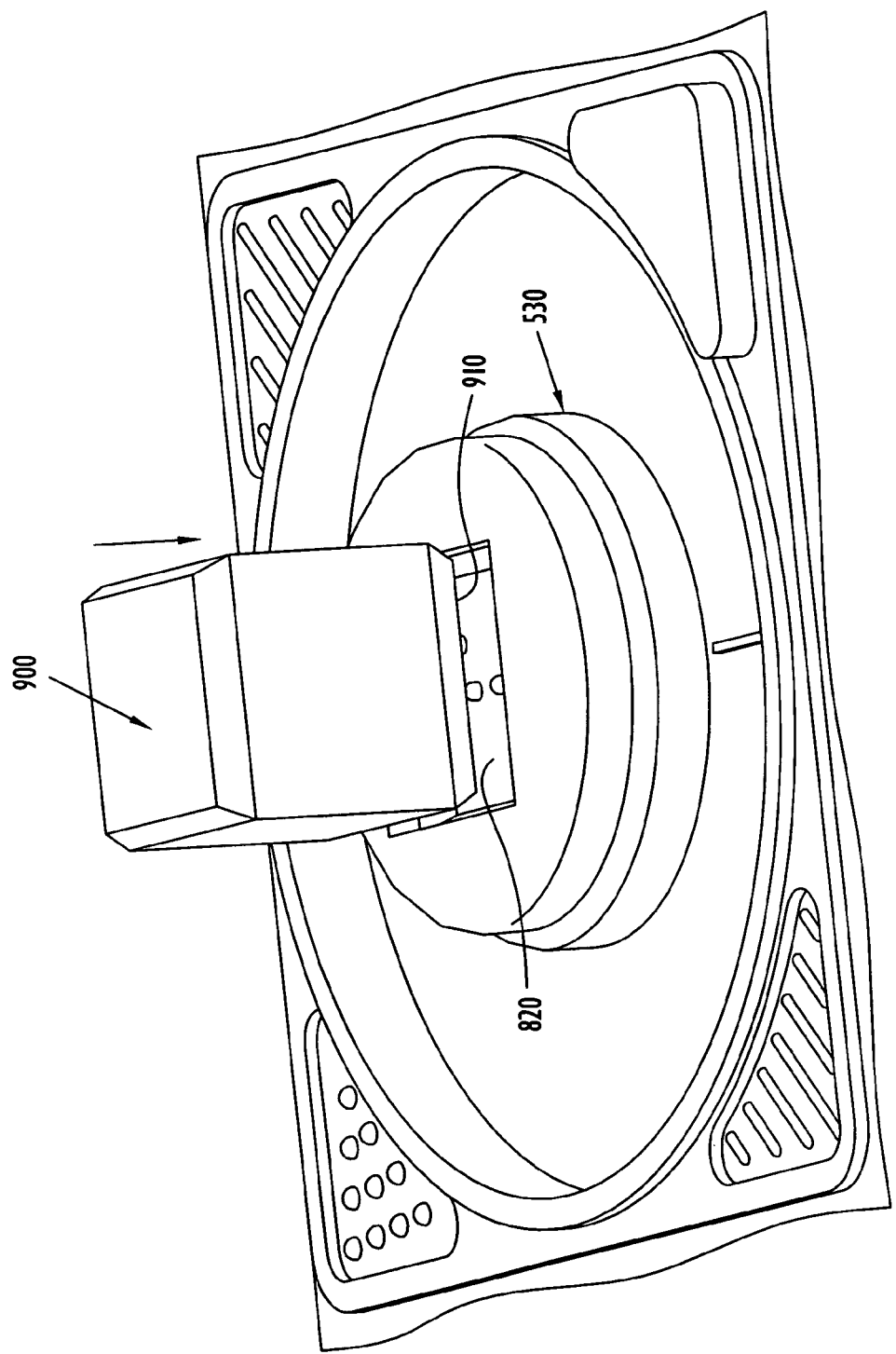
FIG. 10 illustrates a perspective view of the block recognition mechanism of FIG. 7, showing the placement of a toy block into the block recognition mechanism.

Operation of the block recognition mechanism 530 is illustrated in FIG. 10. In use, one of the toy blocks 900 is aligned with the socket 810 of the block recognition mechanism 530 and oriented such that the block base 910, which includes the unique physical pattern 920, faces the base 820 of the block recognition mechanism 530. The toy block 900 is then axially inserted into the socket 810 of the block recognition mechanism 530 until it contacts the base 820. As the toy block 900 contacts the base 820 of the block recognition mechanism 530, the unique physical pattern 920 on the block base 910 selectively engages one or more of the switches 815, 825, 835, 845, 855, and 865 of the switch matrix (the switches are best seen in FIG. 8). A signal unique to the combination of switches 815, 825, 835, 845, 855, and 865 actuated is generated. The control unit then processes the signal and generates block-specific sensory stimulating output.

Figure 11:
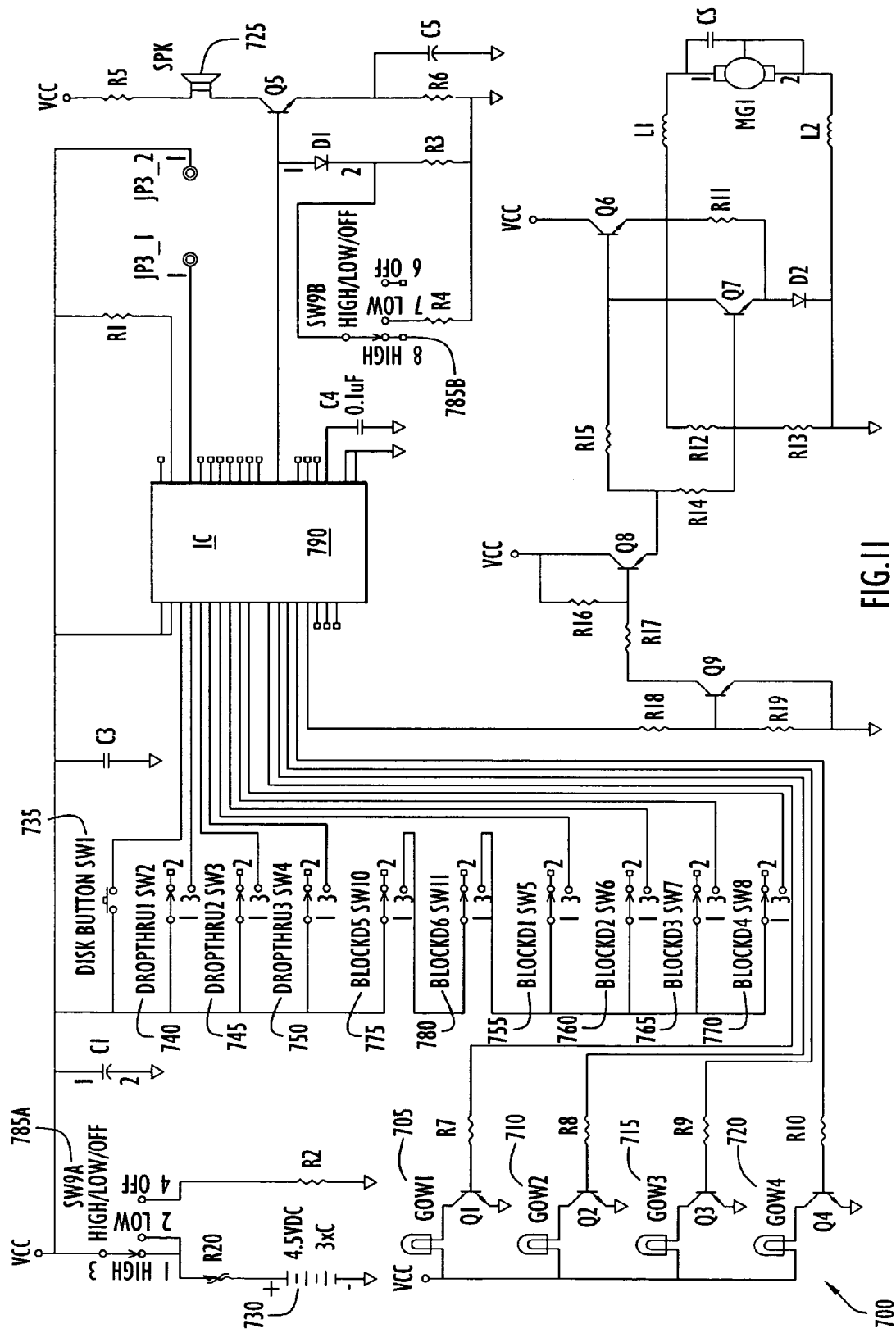
FIG. 11 illustrates a schematic diagram of the control unit of the activity device according to an embodiment of the present invention.

FIG. 11 illustrates a schematic diagram of the electronics assembly 700 associated with the activity device 10 in accordance with the present invention. The electronics assembly 700 may include one or more sensory output generating devices (e.g., light sources, motors, and speakers) that are engaged and disengaged by one of more switches as controlled by a control unit. In the embodiment of FIG. 11, the electronics assembly 700 includes four light emitting diodes (LEDs) 705 (GOW1), 710 (GOW2), 715 (GOW3), and 720 (GOW4); a speaker 725; a power source 730, a control unit 790, and switches 735, 740, 745, 750, 755, 760, 765, 770, 775, 780, 785A, and 785B. The type of power source 730 is not limited, and may include direct and alternating current sources. By way of specific example, three "C" batteries may be used. The control unit 790 may be operably coupled to each of the speaker 725, the power source 730, and the switches 735, 740, 745, 750, 755, 760, 765, 770, 775, 780, 785A, and 785B. The control unit 790 may comprise, but is not limited to, microcontrollers, microprocessors, and integrated circuits. The control unit 790 may be configured to not only recognize signals generated by the various switches 735, 740, 745, 750, 755, 760, 765, 770, 775, 780, 785A, and 785B, but also to generate and control the operational output of the activity device 10 (i.e., of the sensory output generating devices). For example, it may activate the lights 705, 710, 715, and 720, the speaker 725, and the animated member 510, generating electronic sensory stimulating output such as audio and visual output (e.g., sound effects, verbal messages, music, motion, and light patterns).

Each switch 735, 740, 745, 750, 755, 760, 765, 770, 775, 780, 785A, and 785B may be associated with a particular feature of activity device 10. For example, a first switch 735 (SW1) may be associated with the depressible button actuator 520 located on the top side 500 of the activity device 10. When actuated, the first switch 735 communicates with the control unit 790, and switch-specific output is generated (e.g., the motor driving the annular animated member 510 is activated, and music and/or sound effects are generated). A second switch (SW2) 740, a third switch (SW3) 745, and a fourth switch (SW4) 745 may be associated with the three chute switches 435 included in the interactive block activity of the fourth side 400 of the activity device 10 (i.e., the switch 435 disposed along each of the three chutes 420 as shown in the embodiment illustrated in FIGS. 5A–5C). In operation, when a toy block 900 is dropped through a particular chute 420, appropriate switch—the second switch 740, the third switch 745, or the fourth switch 750—is actuated. The actuated switch 740, 745, or 750 sends a signal to the control unit 790, which identifies the switch and generates switch-specific output (e.g., motion, music, lights, and/or sound). A ninth switch (illustrated schematically as 9A and 9B) 785A, 785B may correspond to the power button of the activity device 10, as well as to the volume switch (high/low).

Each of the fifth switch (SW5) 755, the sixth switch (SW6) 760, the seventh switch (SW7) 765, the eighth switch (SW8) 770, the tenth switch (SW10) 775, and eleventh switch 780 (SW11) may correspond to each of the mechanical switches 815, 825, 835, 845, 855, and 865 of the switch matrix located in the block recognition mechanism 530. As explained above, the control unit 790 may be configured to vary the output of the sensory output generating devices to produce predetermined audio and/or visual output depending on the number, as well as the specific combination, of switches (815, 825, 835, 845, 855, or 865) actuated. Specifically, when a toy block 900 is inserted into the block recognition mechanism 530, the unique physical pattern 920 on each block 900 engages the switches 815, 825, 835, 845, 855, 865 of the block recognition mechanism 530 in a unique combination, which in turn, actuates the switches 755, 760, 765, 770, 775, 780 of the electronics assembly 700 in a unique combination. The sensory stimulating output varies, depending on the activation pattern. In this manner, block-specific output can be generated for a plurality of encoded blocks. For example, when the toy block 900A is placed in the block recognition mechanism 530, the block 900A activates the fifth switch 755 and the sixth switch 760 of the electronics assembly 700. That is, the fifth switch 755 and the sixth switch 760 are closed (sending a signal to the control unit 790), while the seventh switch 765, the eighth switch 770, the tenth switch 775, and the eleventh switch 780 remain open. Similarly, when toy block 900B is inserted into the block recognition mechanism 530, the fifth switch 755, the sixth switch 760, and the eighth switch 770 are closed, and the seventh switch 765, the tenth switch 775, and the eleventh switch 780 remain open. Furthermore, when toy block 900C is inserted into the block recognition mechanism 530, the fifth switch 755, the seventh switch 765, and the eighth switch 770 are closed, and the sixth switch 760, the tenth switch 775, and the eleventh switch 780 remain open.

By way of further example, when toy block 900D is placed into the block recognition mechanism 530, the sixth switch 760 and the eighth switch 770 are closed, while the fifth switch 755, the seventh switch 765, the tenth switch 775, and the eleventh switch 780 remain open. When toy block 900E is inserted into the block recognition mechanism 530, the seventh switch 765 and the eighth switch 770 are closed, and the fifth switch 755, the sixth switch 760, the tenth switch 775, and the eleventh switch 780 remain open. When toy block 900F is placed into the block recognition mechanism 530, the fifth switch 755 and the seventh switch 765 are closed, while the sixth switch 760, the eighth switch 770, the tenth switch 775, and the eleventh switch 780 remain open. When toy block 900G is inserted into the block recognition mechanism 530, the fifth switch 755 and the eighth switch 770 are closed, while the sixth switch 760, the seventh switch 765, the tenth switch 775, and the eleventh switch 780 remain open. Finally, when toy block 900H is placed into the block recognition mechanism 530, the fifth switch 755, the sixth switch 760, and the seventh switch 765 are closed, while the eighth switch 770, the tenth switch 775, and the eleventh switch 780 remain open. The switch activation patterns are not limited to the above embodiments, and are provided only as examples.

Thus, signals representing the position (open or closed) of each of the block recognition switches 815, 825, 835, 845, 855, 865 of the block recognition mechanism 530 (schematically illustrated as switches 755, 760, 765, 770, 775, and 780 of the electronics assembly 700) are transmitted to the control unit 790. The control unit 790 performs a "look-up" function to identify which of the blocks 900A–H has been inserted into the block recognition mechanism 530. The control unit 790 can then produce block-specific sensory stimulating output. The output generated by control unit 790 is not limited, and includes electronic sensory stimulating audio output such as music, verbal indications, and sound effects, as well as sensory stimulating visual output such as animation and lights. The audio output, moreover, may relate to a characteristic of the block. For example, if the block is associated with the letter "A", then audio output may relate to that characteristic, e.g., by including verbal audio output stating "A" or "A is for Apple". Similarly, if the block is associated with a character (e.g., ELMO), a figure (e.g., a dog or other animal), or an item (e.g., a car or boat), the output generated may relate to that character, figure, or item. For example, if the item is a guitar, control unit 790 may generate a guitar riff sound effect.

While the invention has been described in detail and with reference to specific embodiments thereof, it will be apparent to one skilled in the art that various changes and modifications can be made therein without departing from the spirit and scope thereof. For example, the activity device 10 can be of any size and shape. The activity device 10 need not be stylized as a cube, and can be stylized as another geometric shape such as pyramids, rectangles, etc. The activity device 10 may also be stylized as a building structure, a vehicle, etc. The interactive block activities are not limited to those disclosed herein, and may include other block activities wherein a block 900 is disposed within an activity that may or may not generate electronic sensory stimulating output. The toy blocks 900 may include sensing device patterns 920 on one side or on multiple sides.

The number of block recognition mechanisms 530 contained on the activity device 10 is not limited. The activity device 10 may include multiple block recognition mechanisms 530 operably coupled to the control unit 790, wherein the control unit 790 is capable of recognizing toy blocks placed within the mechanisms independently of each other, as well as in combination. For example, when two block recognition mechanisms 530 are present, and one toy block 900 representing a drum is placed in the first block recognition mechanism 530, and another toy block 900 representing a guitar is placed in the second block recognition mechanism 530, the resulting output generated by the control unit 790 may represent a combination of the two block outputs (e.g., a song with drum beats and guitar riffs).

The electronics assembly 700 may include any combination of lights, speakers, animated member, motors, and sensory output generating devices. The control unit 790 may produce any combination of audio and visual effects including, but not limited to, animation, lights, and sound (music, speech and sound effects). The output pattern is not limited and includes any pattern of music, lights, and/or sound effects. The electronics assembly 700 may also include additional switches to provide additional sensory output activation.

Thus, it is intended that the present invention covers the modifications and variations of this invention that come within the scope of the appended claims and their equivalents. For example, it is to be understood that terms such as "top", "bottom", "front", "rear", "side", "height", "length", "width", "upper", "lower", "interior", "exterior", "inner", "outer" and the like as may be used herein, merely describe points of reference and do not limit the present invention to any particular orientation or configuration.

We claim:

1. An activity device for use with a plurality of toy blocks, at least two of the toy blocks being of substantially similar geometric shape, the activity device comprising:
    a first side including a first activity configured to receive at least one of the plurality of toy blocks, the first activity comprising a block receiving portion;
    a second side distinct from said first side, said second side including a block recognition mechanism configured to receive any of the plurality of toy blocks, wherein the block recognition unit identifies which of the plurality of toy blocks is received in said block recognition mechanism; and
    a control unit to produce a block-specific sensory output in response to the selective interaction with said block recognition mechanism,
    wherein said first activity does not include a block recognition mechanism.

2. The activity device as claimed in claim 1, wherein said block-specific sensory output is block-specific sound output.

3. The activity device as claimed in claim 2, wherein said block-specific sound output is verbal.

4. The activity device as claimed in claim 2, wherein said block-specific sound output is a sound effect.

5. The activity device as claimed in claim 2, wherein said block-specific sound output is musical.

6. The activity device as claimed in claim 1, wherein said block-specific sensory output is visual output.

7. The activity device as claimed in claim 1 further including a third side distinct from said first side and said second side, wherein said third side includes a second activity comprising a second block receiving portion to receive at least one of the plurality of toy blocks.

8. The activity device as claimed in claim 7, wherein one of said first activity and said second activity is a toy block sorting activity including at least two distinct openings for receiving at least one of the plurality of toy blocks.

9. The activity device as claimed in claim 7, wherein one of said first activity and said second activity is a block stacking activity comprising a block stacking portion which receives at least two of the plurality of toy blocks in a stacked relationship.

10. The activity device as claimed in claim 7, wherein one of said first activity and said second activity is a block drop activity including a mechanism for selectively allowing at least one of the plurality of toy blocks to drop out of the activity device.

11. The activity device as claimed in claim 7, wherein one of said first activity and said second activity is a pachinko block activity including at least one block deflecting post.

12. The activity device as claimed in claim 7 further including a fourth side distinct from said first side, said second side, and said third side, wherein said fourth side includes a third activity comprising a third receiving portion to receive at least one of the plurality of toy blocks.

13. The activity device as claimed in claim 1, wherein the activity device is cube shaped.

14. The activity device as claimed in claim 1, wherein said block recognition mechanism includes a mechanical switch matrix activated by interaction with at least one of the plurality of toy blocks.

15. The activity device as claimed in claim 14, wherein said switch matrix includes a plurality of switches adapted to interact with a pattern on at least one of the plurality of toy blocks.

16. The activity device as claimed in claim 15, wherein said pattern includes a series of raised or recessed concentric rings.

17. A method of producing sensory output in an activity device for use with a plurality of toy blocks, at least two of the toy blocks having a substantially similar geometric shape, the method comprising the steps of:
    providing an activity device for use with a plurality of toy blocks, the activity device including a first side and a second side;
    providing a first activity including a first receiving portion to receive at least one of the plurality of toy blocks on said first side of the activity device;
    providing a block recognition mechanism to receive one or more of the plurality of toy blocks, the block recognition mechanism being positioned on said second side of the activity device; and
    engaging any of the plurality of toy blocks with the block recognition mechanism to produce a block-specific sensory output,
    wherein the first activity does not include a block recognition mechanism.

18. The method as claimed in claim 17, wherein the block-specific sensory output is sound output.

19. The method as claimed in claim 18, wherein said block-specific sound output is verbal.

20. The method as claimed in claim 18, wherein said block-specific sound output is a sound effect.

21. The method as claimed in claim 18, wherein said block-specific sound output is musical.

22. The method as claimed in claim 17, wherein the block-specific sensory output is visual output.

23. The method as claimed in claim 17 further comprising the step of providing a second activity including a second receiving portion to receive at least one of the plurality of toy blocks on a third side of the activity device, the third side being distinct from said first side and said second side.

24. The method as claimed in claim 23, wherein one of the first activity and the second activity is a block sorting activity including at least two distinct openings for receiving at least one of the plurality of toy blocks.

25. The method as claimed in claim 23, wherein one of the first activity and the second activity is a block stacking activity comprising a block stacking portion which receives at least two of the plurality of toy blocks in a stacked relationship.

26. The method as claimed in claim 23, wherein one of the first activity and the second activity is a block drop activity including a mechanism for selectively allowing at least one of the plurality of toy blocks to drop out of the activity device.

27. The method as claimed in claim 23, wherein one of the first activity and the second activity is a pachinko block activity comprising at least one block deflecting post.

28. The method as claimed in claim 17, wherein the activity device is cube shaped.

29. The method as claimed in claim 17, wherein the block recognition mechanism includes a mechanical switch matrix activated by interaction with a physical pattern on at least one of the plurality of toy blocks.

30. The method as claimed in claim 29, wherein the physical pattern includes a series of raised or recessed concentric rings.

31. An activity device for use with a plurality of toy blocks, at least two of the toy blocks being of substantially similar geometric shape, the activity device comprising:
   a first side including a first activity configured to receive at least one of the plurality of toy blocks, the first activity comprising a block receiving portion;
   a second side, distinct from, and perpendicular to said first side, said second side including a block recognition mechanism configured to receive any of the plurality of toy blocks, wherein the block recognition unit identifies which of the plurality of toy blocks is received in said block recognition mechanism; and
   a control unit to produce a block-specific sensory output in response to the selective interaction with said block recognition mechanism.

32. The activity device as claimed in claim 31, wherein said block-specific sensory output is block-specific sound output.

33. The activity device as claimed in claim 32, wherein said block-specific sound output is at least one of verbal output, a sound effect, musical output, and visual output.

34. The activity device as claimed in claim 31 further including a third side distinct from and perpendicular to said first side and said second side, wherein said third side includes a second activity comprising a second receiving portion to receive at least one of the plurality of toy blocks.

35. The activity device as claimed in claim 34, wherein one of said first activity and said second activity is a toy block sorting activity including at least two distinct openings for receiving at least one of the plurality of toy blocks, a block stacking activity comprising a block stacking portion which receives at least two of the plurality of toy blocks in a stacked relationship, a block drop activity including a mechanism for selectively allowing at least one of the plurality of toy blocks to drop out of the activity device, or a pachinko block activity including at least one block deflecting post.

* * * * *